Figure 1:
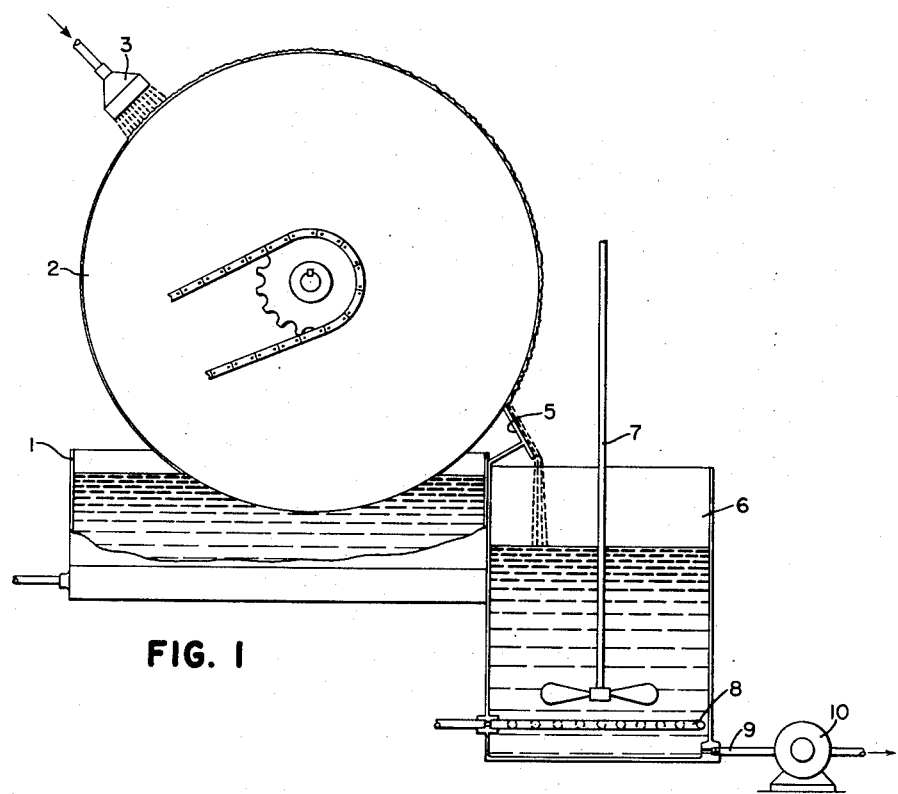

March 31, 1964   H. A. ENDRES ETAL   3,127,367
METHOD AND APPARATUS FOR ADDING LATEX TO HOT BITUMEN
Filed March 14, 1960

INVENTOR.
HERBERT A. ENDRES
WARREN W. BURR
BY
J. B. Holden
ATTORNEY

United States Patent Office 3,127,367
Patented Mar. 31, 1964

3,127,367
METHOD AND APPARATUS FOR ADDING LATEX TO HOT BITUMEN
Herbert A. Endres, Silver Lake, and Warren W. Burr, West Richfield, Ohio, assignors to The Goodyear Tire & Rubber Company, Akron, Ohio, a corporation of Ohio
Filed Mar. 14, 1960, Ser. No. 14,642
7 Claims. (Cl. 260—28.5)

This invention relates to a process and apparatus for rubberizing fluidizable bitumens by the direct addition of latex to the bitumens without excessive loss of time or foaming caused by the evaporation of the water. More particularly, this invention relates to a process and apparatus for the addition of latex to a moving film of hot fluid bitumens.

It is generally known that certain physical properties of bitumens are improved by the incorporation of rubber or elastomers. Normally the addition of about 3% by weight of elastomer is sufficient to give a significant improvement in physical properties of the bitumens, for example, in the ductility and toughness thereof although as little as 1 or 2% may be used for some purposes. It is known also that good results are obtained when the rubber or elastomer is added to the bitumens as a latex and at temperatures and conditions which do not cause appreciable degradation of the rubber latex. Most latices contain at least 50%, or as much as 75 to 80% by weight of water. This water causes troublesome foaming during the addition of the latex to the hot bitumen. Consequently foaming of the fluid bituminous material results in considerable delay while the water is evaporated and slows the rate of addition of latex to the hot bitumen.

Therefore, a principal object of this invention is to provide a process and apparatus for incorporating latex in hot bituminous materials without the aforesaid foaming and time loss difficulties.

A further object of this invention is to provide a process and apparatus whereby the water in the latex is removed immediately upon the addition of the latex to the bituminous material with no delays occasioned by excessive foaming, thereby allowing said additions to be made under uniform and controlled foaming conditions without incurring the hazard of explosions due to the accumulation of the water in the bitumen and its sudden vaporization when the temperature is raised to about 250° F.

Still further objects of this invention will be obvious from the following drawings of the apparatus and the descriptions of the operation of this invention.

The objects of this invention are obtained (1) by forming a moving film of hot bituminous material, and (2) adding the latex to the moving film in substantially a uniform and continuous manner, and (3) maintaining the film at a sufficiently elevated temperature to volatilize the water in the latex substantially as fast as the latex is added to the bituminous film. Preferably these objects are obtained by forming the moving film on an endless movable imperforate surface such as either a revolving drum or a moving belt. The drum or moving belt may have auxiliary beating means to maintain the film of bitumen at a temperature above the instantaneous volatilization temperature of water. Normally, the temperature of the moving film should be around about 300° F. to 450° F. although slightly higher or lower temperatures may be used providing the length of time the film is exposed to the open atmosphere is sufficient to allow most of the water to evaporate. The film of bituminous material is best formed by allowing the revolving drum or moving belt to move beneath or in contact with the surface of a reservoir of hot molten bituminous material.

An alternate method for forming the film is to spray or pump the hot molten bituminous material into contact with the revolving drum or moving belt.

A preferred arrangement of apparatus for accomplishing the objects of this invention is shown in FIG. 1 wherein 1 is a tank having an open top and containing molten bituminous material. A revolving drum 2 is positioned above tank 1 and projects down inside tank 1 a sufficient distance to extend beneath the surface of the molten bituminous material. The revolving drum 2 may be driven by any suitable means, such as a chain drive or positive drive belt. The latex is added to the revolving drum 2 by means of the spray or drip head 3 from a latex supply, such as a tank car. Thus, it is apparent that each revolution of drum 2 beneath the surface of the bituminous material will pick up a thin film of the material on the imperforate surface of the drum. As the film passes beneath the spray head 3, it is contacted with a stream or spray of latex. Since the film of bituminous material is above the boiling point of the water in the latex, the latex emulsion is broken and the water rapidly evaporates forming small bubbles on the surface of the drum as it passes from beneath the spray head 3 to the doctor blade 5. It should be appreciated that water does not evaporate from bitumen at temperatures below 250° F. The doctor blade 5 removes the film of rubberized bituminous material from the drum and causes it to drop or pour into mixing tank 6. Mixing tank 6 is fitted with a stirrer 7 which may be driven by any suitable means, not shown, and a heating coil 8 or other suitable heating means. The rubberized bituminous material is allowed to accumulate in tank 6 and is stirred for approximately one-half hour to obtain a uniform dispersion of the rubber in the bituminous material. Normally, after about one-half hour of mixing in the mixing tank 6, microscopic examination of the rubberized bituminous material shows an optimum distribution of the rubber particles within the bituminous material. It should be appreciated that shorter or longer dwell times in tank 6 may be required depending on the stirrer efficiency and the temperature of the mixture. The rubberized bitumen in tank 6 may be removed by means of line 9 and pump 10 for whatever use is to be made of it, for example, to prepare a road mix with aggregate.

Figure 2:
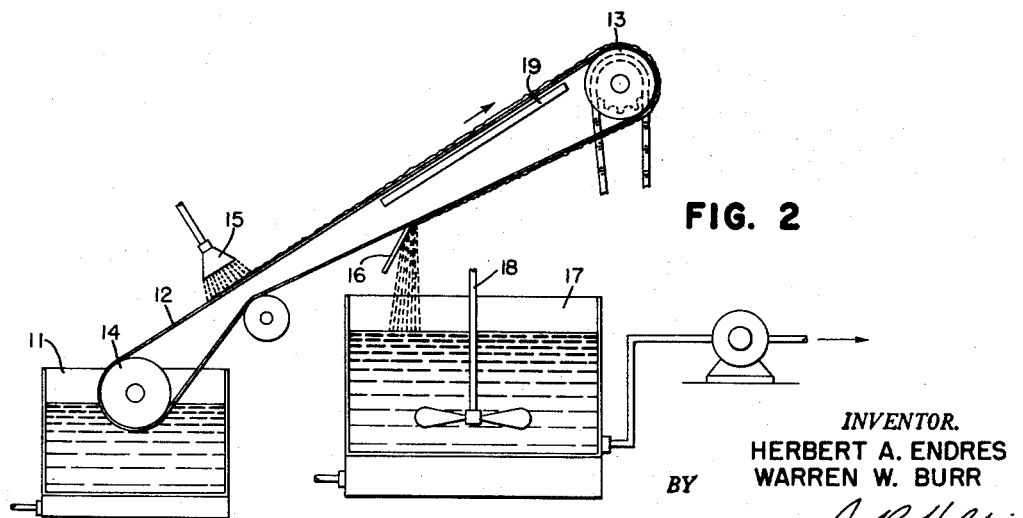

An alternate method of forming a thin film of bituminous material is shown in FIG. 2 wherein 11 is an open-topped tank having a moving belt 12 having one end thereof projecting beneath the surface of the molten or fluid asphalt within said tank. Belt 12 is shown inclined from the vertical and supported on the head and tail pulleys 13 and 14, respectively. As the belt moves beneath the surface of the bitumen in tank 11, it forms a thin film on the upper surface of said belt. It should be obvious that if the direction of rotation of the belt was reversed, the bitumen film would be on the underside thereof. As the belt moves beneath the spray head 15 it is contacted with latex from the spray head. As the belt moves around the head pulley 13, toward tail pulley 14, it is contacted by a doctor knife 16 to cause the rubberized bitumen to drop into tank 17 which is heated and fitted with a stirrer 18. Normally, it is preferred that the speed of the belt and the drum be adjusted to give sufficient time for the evaporation of the water from the bituminous film. Of course, this time will vary depending upon the amount of water to be evaporated and the temperature of the bituminous film. Thus, as the rate of addition of latex is increased the amount of water to be evaporated will increase in like proportion. Thus the speed of the revolving drum would need to be slowed down or the temperature of the bituminous film increased by heater 19 to permit most of the water to be vaporized before the material drops into tank 17, although stirrer 18 will permit the material in tank 17 to contain a small percentage of water without experiencing too much difficulty from foaming.

The bituminous materials useful in this invention are any of those well known to the art, such as coal tar pitches, pyrogenous asphalts, native asphalts, etc. Specific examples of these are the asphalts obtained from petroleum crude oils, crack tars, gas oil tars, coke oven tars, Trinidad asphalts, etc. Normally, the preferred asphalts and bitumens are those satisfactory for use in building roads, lining canals, roofing, and related uses which meet the State and Federal Government specifications, and frequently referred to in the trade as AC, RC, MC and SC type asphalts and cut-back bituminous materials.

Any rubber or elastomeric type latex may be used but those latices which have lower cost are generally preferred since one of the disadvantages of rubberized bituminous materials is their inherent higher cost. Natural rubber latices, butadiene-styrene latices, i.e. GR–S latices, polybutadiene latices, butadiene-acrylonitrile latices and polyisoprene latices are representative examples of useful latices. It is preferred to use GR–S types of latex containing about 26–28% by weight of rubber. These are latices of a 70/30 butadiene-styrene copolymer.

Normally the latices made by the homopolymerization or copolymerization of acrylonitrile are preferred with the coal tar bitumens since these latices give a specific enhancement to the physical properties of the coal tar bitumens.

TABLE 1

|  | 85/100 Penetration Asphalt | Rubberized Asphalt |
| --- | --- | --- |
| Softening point, ° R and B, ° F | 116 | 123 |
| Penetration at 77° F., centimeters | 104 | 103 |
| Ductility, 5 centimeters/minute: | | |
| 39.2° F | 9 | 55 |
| 77 ° F | 67 | 150+ |
| Instron Toughness, inch/pounds | 40 | 255 |

*Example*

An 85 to 100 penetration asphalt was charged into the tank of FIG. 1 to the level indicated and heated to about 400° F. with the drum rotating at 20 revolutions per minute. A butadiene-styrene copolymer latex was sprayed upon the rotating drum to yield a product containing 3% by weight of rubber on an asphalt basis. After about 30 minutes of operation, a sample was taken from the mixing tank and tested. Under microscopic examination, it was found to have an excellent network of dispersed rubber particles. Table 1 compares the physical properties of this rubberized asphalt with the original asphalt. Toughness of these samples was measured on the Instron apparatus with a cross head and chart speed of 20 inches per minute at 70° F. and at a relative humidity of 50%. The butadiene-styrene copolymer latex was readily incorporated into the asphalt upon the drum and this incorporation was achieved at a fairly rapid rate and without appreciable foaming.

On the other hand, if the same amount of latex had been added to hot asphalt in a tank by conventional methods, it would have required more than 4 hours to eliminate the water with the operator being subjected to the potential hazard of an explosion if the temperature of the asphalt is raised above 250° F. with appreciable water still present in the asphalt.

Similarly when coal tar flux (90 to 130° F. softening point ring and ball method) was substituted for the asphalt above it was found that the latex, in this case a butadiene-acrylonitrile copolymer, incorporated to give a microscopic rubber dispersion with no foaming difficulties.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for mixing latex and bitumen comprising a tank for holding a molten bitumen, an endless movable means having an imperforate surface, a portion of which moves into and out of said tank for moving a thin film of said bitumen from said tank against the force of gravity, means for spraying a controlled amount of latex onto the bitumen film, means for maintaining the film while on the endless movable imperforate surface at about 300° F. to 450° F. and for a sufficient time to evaporate most of the water from the latex added to the bitumen film to leave a rubberized bitumen mixture upon the endless surface and a means for removing the rubberized bitumen mixture from the endless surface, a second tank for receiving the rubberized bitumen and means for agitating said rubberized bitumen within the second tank whereby a uniform dispersion of the rubber and bitumen is obtained.

2. Apparatus for mixing latex and bitumen comprising a tank for holding a molten bitumen, an imperforate rotatable drum mounted in contact with the molten bitumen whereby the rotation of the drum forms a fluid film of bitumen on the surface thereof, means for rotating and controlling the speed of said drum, means for spraying latex onto the film on the rotatable drum, means for maintaining the bitumen film within the predetermined temperature range for sufficient time to evaporate the water from the latex added to the bitumen film and thereby leave a film of rubberized bitumen upon the surface of the drum, a second tank for receiving the rubberized bitumen and means for agitating said rubberized bitumen within the second tank whereby a uniform dispersion of the rubber and bitumen is obtained.

3. Apparatus for mixing latex and bitumen comprising a tank for holding a molten bitumen, a movable imperforate belt contacting the molten bitumen and extending up and out therefrom, means for moving said belt to pick up a film of molten bitumen, means for spraying a latex onto the film on the moving belt and means associated with said molten bitumen tank for maintaining the temperature of the bitumen film within a pre-determined temperature range for sufficient time to evaporate the water from the latex added to the bitumen film and thereby leave a film of rubberized bitumen upon the surface of the drum, a second tank for receiving the rubberized bitumen and means for agitating said rubberized bitumen within the second tank whereby a uniform dispersion of the rubber and bitumen is obtained.

4. A process for forming rubberized bitumens comprising (1) forming a moving film of hot bitumens, (2) adding a latex to said moving film in substantially a uniform and continuous manner, and (3) maintaining the film at a sufficiently elevated temperature for sufficient time to volatilize substantially all the water in said latex as fast as the latex is added to the film.

5. A process for incorporating rubber into a hot fluid bitumen comprising (1) moving a film of hot bitumen against the force of gravity, (2) adding a latex to said moving film in substantially a uniform and continuous manner and at a rate sufficient to allow most of the water in said latex to volatilize substantially as fast as the latex is added, and (3) maintaining said film at a sufficiently elevated temperature for sufficient time to volatilize most of the water in said latex.

6. A process for incorporating rubber into a hot fluid bitumen comprising adding a small amount of latex substantially continuously to a moving film of hot fluid bitumen, the temperature of the bitumen being between about 300° F. and 450° F. and keeping the film moving a sufficient length of time after the addition of the latex to allow substantially all of the water to evaporate.

7. The process of claim 6 wherein the rate of addition of latex is controlled to give a rubberized bitumen having at least about 3% by weight of rubber on a bitumen basis.

References Cited in the file of this patent

UNITED STATES PATENTS

| | | |
|---|---|---|
| 839,591 | Huntley | Dec. 25, 1906 |
| 2,119,594 | McLean | June 7, 1938 |
| 2,686,166 | Taylor | Aug. 10, 1954 |
| 2,841,060 | Coppage | July 1, 1958 |
| 2,849,429 | Cines | Aug. 26, 1958 |
| 2,921,105 | Benson | Jan. 12, 1960 |

OTHER REFERENCES

"Chemical Engineers' Handbook" (Perry), third edition, published by McGraw-Hill Book Co., Inc., pages 1164–1166 relied on. (Copy in Scientific Library.)

Dedication 3,127,367.—*Herbert A. Endres*, Silver Lake, and *Warren W. Burr*, West Richfield, Ohio. METHOD AND APPARATUS FOR ADDING LATEX TO HOT BITUMEN. Patent dated Mar. 31, 1964. Dedication filed Jan. 17, 1969, by the assignee, *The Goodyear Tire & Rubber Company*.

Hereby dedicates to the people of the United States the entire term of said patent.

[*Official Gazette June 10, 1969.*]